United States Patent [19]

Carstens

[11] 4,245,935
[45] Jan. 20, 1981

[54] APPARATUS FOR CONTROLLING VEHICLES MOVING THROUGH A CONDUIT BY AIR

[75] Inventor: Marion R. Carstens, Atlanta, Ga.

[73] Assignee: Georgia Tech. Research Institute, Atlanta, Ga.

[21] Appl. No.: 47,794

[22] Filed: Jun. 12, 1979

[51] Int. Cl.³ .............................................. B65G 53/28
[52] U.S. Cl. ...................................... 406/105; 406/76; 406/192
[58] Field of Search ............... 406/105, 109, 110, 111, 406/147, 148, 149, 150, 176, 93, 94, 83, 84, 192, 76

[56] References Cited

U.S. PATENT DOCUMENTS

| 268,715 | 12/1882 | Needham | 406/111 X |
|---|---|---|---|
| 3,881,425 | 5/1975 | Carstens | 406/105 X |
| 3,999,487 | 12/1976 | Valverde | 406/105 X |
| 4,165,845 | 8/1979 | Carstens et al. | 406/192 |

*Primary Examiner*—James L. Rowland
*Attorney, Agent, or Firm*—Newton, Hopkins & Ormsby

[57] ABSTRACT

An apparatus for controlling vehicles which are moved through a conduit by air and includes a processing system positioned in the conduit for collecting, storage and dispatching the vehicles in which an air pump is positioned in parallel with the processing system having its suction connected to the conduit upstream of the system and its discharge connected to the conduit downstream of the system. Valve means are connected to the conduit for reducing the tendency of the vehicles in the processing system to move upstream towards the pump suction. The valve means alternates the pressure in a portion of the processing system between less than atmospheric and at least atmospheric. One form of the valve means may include an air blocking vehicle stop movable into and out of the conduit and a valve connected between the conduit and the atmosphere upstream of the vehicle stop which is open and closed in synchronism with the vehicle stop. In addition, a second valve may be connected between the conduit and the pump suction upstream of the air blocking vehicle stop for speeding up the vehicle processing. In another embodiment, first and second swingable flap valves may be positioned in the conduit in the upstream portion of the processing system with an air flow control connected to the pump suction and positioned for alternately withdrawing air from the conduit upstream of each of the first and second valves for allowing the vehicles to pass through the flap valves, but preventing the application of the pump suction to the conduit downstream of the second valve.

4 Claims, 4 Drawing Figures

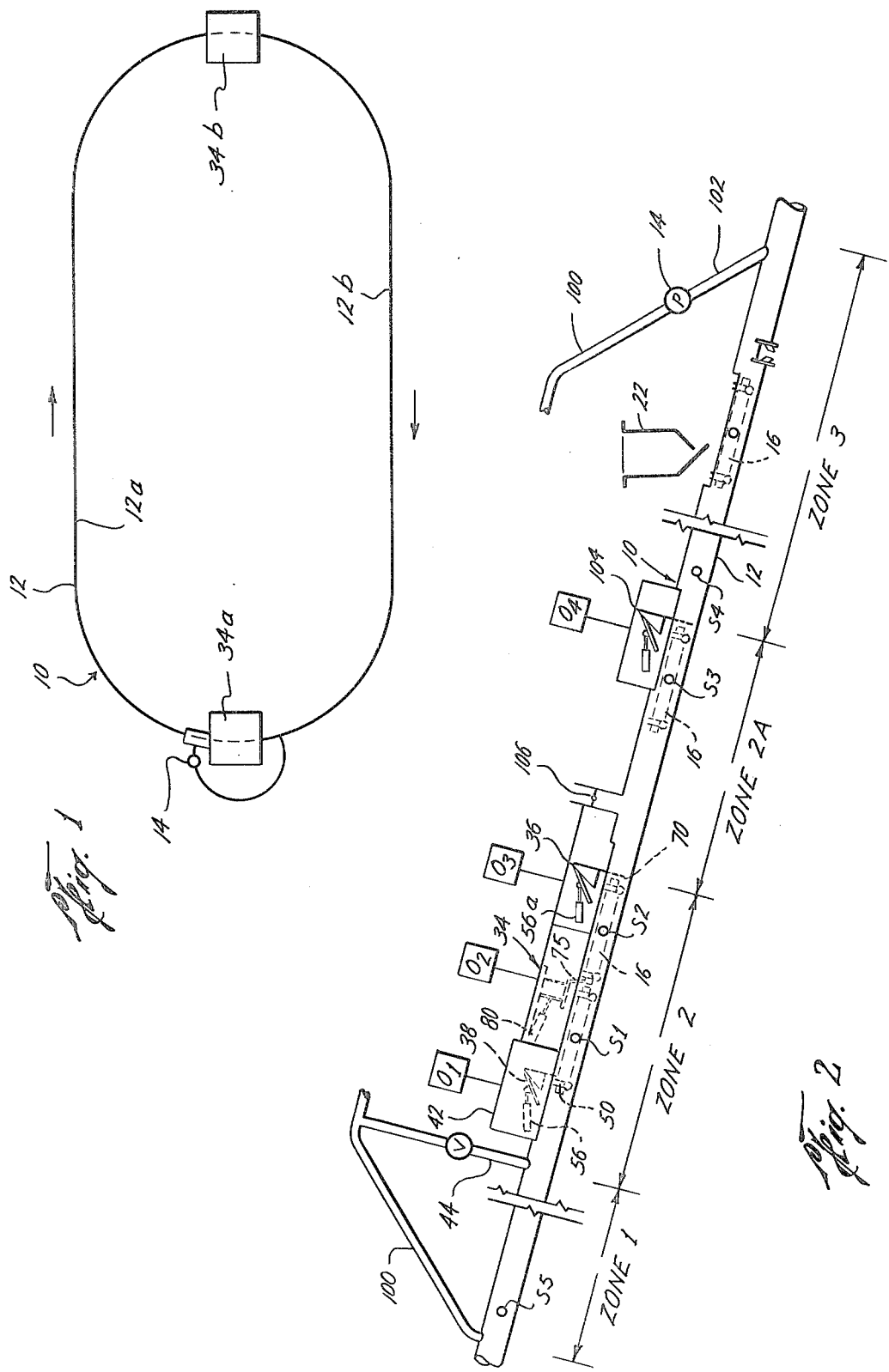

APPARATUS FOR CONTROLLING VEHICLES MOVING THROUGH A CONDUIT BY AIR

BACKGROUND OF THE INVENTION

The movement of load carrying vehicles through a conduit by air in which the vehicles are suitably collected, stored, and dispatched are disclosed in copending patent application Ser. No. 894,108 entitled "Method and Apparatus for Processing Vehicles Moving Through a Conduit by Air" filed Apr. 6, 1978, now U.S. Pat. No. 4,165,845. In that system, the pump was positioned with its suction intake connected to the downstream side of the processing system. It is desirable in some applications to place the air pump in parallel with the processing system thereby utilizing the pump to move vehicles downstream of the processing system by a positive pressure and at the same time draw vehicles to the processing system by the pump suction. However, the application of the pump suction to the upstream side of the processing system tends to cause reverse air flow through the processing system and undesirably acts on the vehicles in a direction which tends to move them upstream.

The present invention is directed to various improvements in an apparatus for controlling vehicles moving through a conduit by air in which a pump can be positioned in parallel with the processing system and suitable valve means connected to the conduit for reducing the tendency of the vehicles in the processing system to move upstream.

SUMMARY

The present invention is directed to an apparatus for controlling vehicles which are moved through a conduit by air provided by a pump which is positioned in parallel with a processing system in the conduit which collects, stores and dispatches vehicles. Valve means are connected to the conduit for reducing the tendency of the vehicles in the processing system to move upstream.

Yet a further object of the present invention is the provision of valve means for alternating the pressure in a portion of the processing system between less than atmospheric and at least atmospheric thereby overcoming the tendency of the pump suction to create reverse air flow through the processing system.

Still a further object is the provision wherein the valve means includes an air blocking vehicle stop movable into and out of the conduit and a valve connected between the conduit and the atmosphere upstream of the air blocking vehicle stop. The valve is opened and closed in synchronism with the air blocking vehicle stop to alternate the pressure in the valve lock between less than atmospheric and atmospheric where a vehicle may flow into the valve lock from a subatmospheric portion of the processing system and may move from the valve lock to an atmospheric portion of the processing system.

A still further object of the present invention is the provision of a valve means which includes an air blocking vehicle stop movable into and out of the conduits, a first valve connected between the conduit and the atmosphere upstream of the vehicle stop, and a second valve connected between the conduit and the pump suction upstream of the vehicle stop. The first and second valves are simultaneously but alternately actuated for more rapidly equalizing the pressures in the valve lock for the admission and exit of a vehicle thereto and therefrom.

Yet a still further object of the present invention is the provision of a valve means positioned at the upstream end of the processing system which includes first and second overhead swingable valves in the conduit which are adapted to move between a closed position blocking off the conduit and an open position permitting a vehicle to move therethrough in which an air flow control means is connected to the suction of the pump and positioned for alternately withdrawing air from the conduit upstream of each of the first and second valves for allowing the vehicles to pass through the first and second valves, but preventing the application of the pump suction to the conduit downstream of the second valve.

Yet a still further object is the provision of the improvement in the processing system in which vehicles are moved through a conduit by air in which the conduit includes zones one, two and three in sequence from an upstream portion and are downwardly inclined and in which an air blocking vehicle stop is movable into and out of the conduit at the downstream end of zone two for stopping a vehicle in zone two and releasing the vehicle to zone three. A vehicle holding arm is positioned upstream of the vehicle stop and is movable into and out of the conduit in zone two and alternates with the vehicle stop for holding additional vehicles in zones 1 and 2 when the stop releases a vehicle to zone 3 and feeds a vehicle towards the vehicle stop. A pump is provided in parallel with zones one, two and three with the suction connected to zone one and the discharge connected to zone three. Valve means are connected to the conduit for reducing the tendency of the vehicles in zone one and two to move upstream.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is a schematic elevational view illustrating a transportion system in which load carrying vehicles move through a loop conduit by air, FIG. 2 is an elevational view, partly schematic, and partly fragmentary, illustrating one embodiment of the present invention positioned in a processing system in a conduit in which vehicles are moved by air.

DESCRIPTION OF THE PREFERRED EMBODIMENTS

Figure 3:
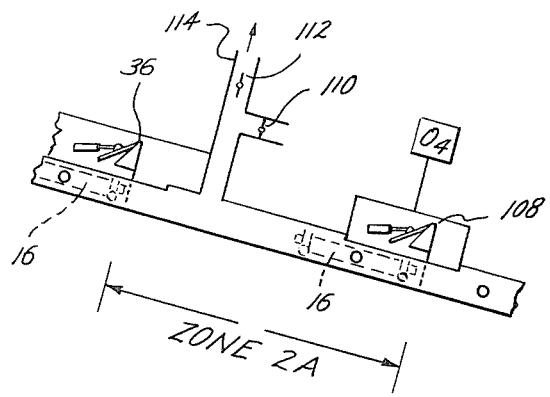
FIG. 3 is an elevational view, partly schematic, and partly fragmentary, illustrating the use of another embodiment of the present invention in a processing system in which vehicles are moved through a conduit by air.

Referring now to the drawings, and particularly to FIGS. 1 and 2, the present invention may be used in any suitable air actuated conduit transportation system such as that disclosed in U.S. Pat. No. 4,165,845, which is incorporated herein by reference and is referred to generally by the reference numeral 10. The system 10 includes a tubular conduit or pipeline 12 having one or more suitable air pumps 14 for creating a flow of air through the pipeline 12 for moving wheeled vehicles 16 therethrough.

The transportation system 10 includes one or more processing systems, such as 34a and 34b, for collecting, stopping and dispatching vehicles 16 in a periodic manner and may generally include a first zone 1 for collecting and temporarily storing excess vehicles 16, a second zone 2 for positioning and releasing individual vehicles 16 in a desired sequence regardless of whether the vehicles 16 arrive singularly or in bunches in the system 34a or 34b, and a third zone 3 which is the operating zone.

The processing zone 2 is a space in the conduit 12 for two vehicles 16 and generally includes an air blocking vehicle stop 36 at the downstream end of zone 2 and a vehicle holding arm 38. The vehicle stop 36 is movable into and out of the conduit 12 to provide a dead-end air stop which decelerates incoming vehicles 16 in zones 1 and 2 as well as providing a stop barrier to prevent the forward movement of a vehicle 16 when the stop 36 is in the closed position. The holding arm 38 is generally movable into and out of the conduit 12 for holding a second vehicle 16 in position when the leading or first vehicle 16 is being released from zone 2 to zone 3. The first vehicle 16 resting against the stop 36 will not be released into zone 3 until operating zone 3 is clear and a second vehicle 16 is positioned behind the first vehicle in zone 2. In this event, the stop 36 will open releasing the first vehicle into the operating zone 3 and simultaneously the holding arm 38 will move into the conduit 12 holding the second vehicle 16 in position. After the leading vehicle 16 is released to zone 3, the stop 36 closes and the holding arm 38 releases the second vehicle 16 and the second vehicle 16 moves up against stop 36 and becomes the leading vehicle in the next cycle. Another incoming vehicle 16 from zone 1 will roll down, decelerate by compressing the air behind the stop 36 and the first vehicle 16 and will rest in zone 2 beneath the holding arm 38. Zones 1, 2 and 3 are inclined downwardly allowing the vehicles 16 to roll downwardly unless restrained. However, if desired on releasing a leading vehicle 16 from behind the stop 36 into zone 3, a suitable mechanical accelerator 34 may be provided to provide a more positive start to the vehicle 16 released by the stop 36.

Zone 1 is an enclosed portion of the conduit 12 which extends upstream from zone 2 and may include a throttled vent 44 which exhausts air from the front of a vehicle 16 moving into zone 1 allowing an incoming vehicle 16 to move positively into the line of stationary vehicles, but without severe impact. Normally, the processing systems 34a and 34b include various operational functions such as a loading station or an unloading station. For example, processing system 34a may include a loading station which includes a hopper 22 for filling a vehicle 16 with various types of loads such as particulate solids. In this case, the processing system 34b may include an unloading station such as described in U.S. Pat. No. 3,724,690.

The vehicles 16 may be of any suitable type of car or a plurality of cars forming a train which has a cross-sectional area similar in shape and size but slightly smaller than the interior of the conduit 12 on which the air moving through the conduit 12 acts to push the vehicle 16 through the conduit 12 as more fully described in the above mentioned U.S. Pat. No. 4,165,845.

A control system may be provided which includes a series of vehicle position sensing means S1, S2, S3, S4 and S5, such as photocells may be provided for actuating suitable operators O1, O2 and O3 for the arm 38, accelerator 34, and stop 36, respectively.

Any suitable holding arm mechanism 38 may be provided which is encased in an air tight enclosure 42 and includes an arm 50 actuated by a pneumatic piston and cylinder assembly 56. The air blocking and vehicle stop 36 may generally include a circular disk 70 which is actuated by a pneumatic piston and cylinder assembly 56a. The accelerator 34 may include a member 75 actuated by a pneumatic piston and cylinder assembly 80.

The above description of a tranportation system 10 and processing system are generally and more fully described in U.S. Pat. No. 4,165,845. However, in some applications it has been found desirable to connect the suction or inlet 100 of the pump to the upstream side of a processing system such as 34a and the discharge or outlet 102 to the downstream side of the processing system 34a. Thus portion 12a of the conduit loop is operated as a pressure system and the return portion 12b is operated as a vacuum system thereby utilizing both the positive pressure in conduit 12a and the negative pressure in conduit 12b as driving forces for moving vehicles 16 therethrough. In fact, in some instances, only a single pumping station 14 need be utilized. However, this results in a vacuum pressure being applied to the upstream side of the processing system 34a and exerts a force on the vehicles 16 behind the stop 36 to cause the vehicles 16 to have a tendency to move upstream instead of downstream. That is, the stop 36 would have some air leakage and the pressure on the upstream side of stop 36 would be below atmospheric pressure while the pressure downstream from the stop 36 would be atmospheric pressure.

The present invention is directed to an apparatus controlling vehicles which are moved through a conduit by air having a processing system positioned in the conduit for collecting, storing, and dispatching the vehicles in which an air pump is provided in parallel with the processing system and valve means are connected to the conduit for reducing the tendency of the vehicles in the processing system to move upstream.

Referring now to FIG. 2, the preferred embodiment for moving the leading vehicle 16 from behind the vehicle stop 36 in which the pressure is less than atmospheric into a region beyond the stop 36 in which the pressure is equal to the atmospheric pressure is best seen. A valve means or lock is provided in a zone 2A between zones 2 and 3 in which the pressure would alternate between less than atmospheric and at least atmospheric thereby allowing a vehicle 16 to be moved from zone 2 to zone 3. Zone 2A includes a second air blocking vehicle stop 104, controlled by a suitable operator O4, which may be identical to stop 36 and includes a valve such as a butterfly valve 106 connected between the conduit 12 and the atmosphere upstream of the air blocking vehicle stop 104. As shown in FIG. 2, when both the stop 104 and the valve 106 are in the closed position the pressure in zone 2A is less than atmospheric due to some air leakage through stop 36. When a vehicle is to be released from zone 2, stop 36 is opened and the leading vehicle 16 is rolled by gravity down the inclined conduit 12 or pushed forward by the accelerator 34 into zone 2A. When the vehicle 16 has cleared the vehicle stop 36, stop 36 is closed. The newly released vehicle 16 rolls forward into zone 2A coming to rest against the back of the vehicle stop 104, as shown in dotted outline. When zone 3 is clear the stop 104 and the valve 106 are simultaneously opened raising the pressure in zone 2A to atmospheric pressure. This allows the vehicle in zone 2A to roll from the now atmospheric pressure in zone 2A into the atmospheric pressure of zone 3. When the vehicle has cleared zone 2A, both the stop gate 104 and the valve 106 are closed allowing the pressure in zone 2A to again become less than atmospheric.

Referring now to FIG. 3, another embodiment is shown which provides a more rapid pressure reduction of zone 2A to increase the speed of processing of a vehicle 16 through the processing system 34a. Again, an air blocking vehicle stop 108 is provided which may be identical to stop 36 and an air valve 110 is provided which is in communication between the conduit 12 and the atmosphere upstream of the air blocking vehicle stop 108. A second valve 112 is provided in the line 114 in communication with conduit 12. The line 114 is connected to the suction 100 of the pump 14. As shown in FIG. 3 with the valves 108 and 110 closed and the valve 112 open, the pressure in zones 2 and 2A would be less than atmospheric. When stop 36 is opened, the vehicle 16 behind the stop 36 would roll or be pushed into zone 2A and would move therein more quickly due to the suction in line 114 pulling the vehicle therein. As soon as the vehicle had cleared stop 36, valve 112 is closed shutting off the suction in line 114, and valve 110 is opened, thereby allowing the pressure in zone 2A to rise to atmospheric. When zone 3 is ready to receive the vehicle 16 from zone 2A, stop 108 is opened and the vehicle in zone 2A will move freely from the atmospheric pressure in zone 2A to the atmospheric pressure in zone 3. After the vehicle has cleared the stop 108, stop 108 is closed, and valve 110 is closed to prepare for the next cycle.

Figure 4:
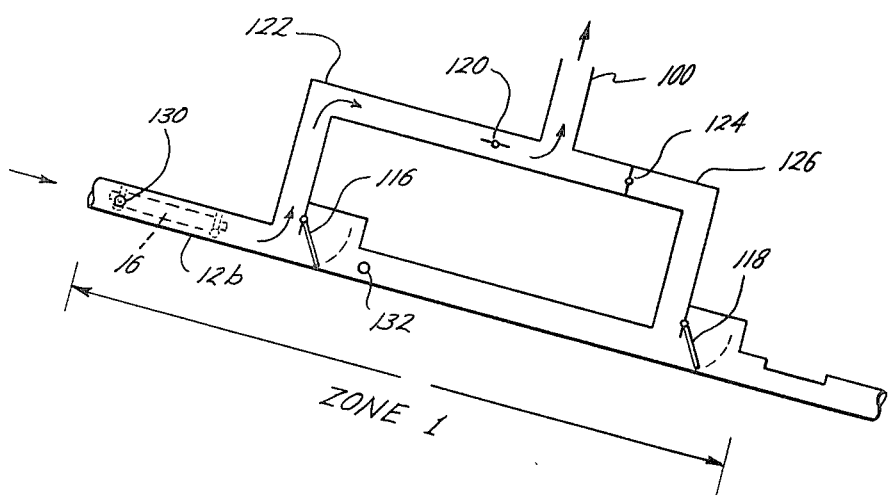
FIG. 4 is an elevational view, partly schematic, and partly fragmentary, illustrating the use of a third embodiment of the present invention in a transportation system in which vehicles move through a conduit by air.

Referring still to a further embodiment, a valve system is shown in FIG. 4 which may be substituted for zone 1 to prevent the application of the suction of the pump 14 to the processing system 34a. In this embodiment a first overhead suspended swingable valve such as a flap gate 116 is provided in the return conduit 12b which is adapted to move between a closed position, as shown, blocking off the conduit and an open position permitting a vehicle 16 to move therethrough. A second overhead suspended swingable valve such as a flap gate 118 is positioned in the conduit 12b and is adapted to move between a closed position blocking off the conduit 12b and an open position permitting a vehicle to move therethrough. A suitable air flow control means is connected to the suction 100 of the pump for alternately withdrawing air from the conduit 12b upstream of each of the first 116 and second 118 flap gate for allowing a vehicle to pass through the first gate 116 and the second gate 118, but preventing the application of the pump suction to the conduit 12b downstream of the second gate 118. Thus, a butterfly valve 120 is connected in a passageway 122 which is connected between the suction 100 and the conduit 12b at a location upstream of the first gate 116. A second butterfly valve 124 is positioned in a second passageway 126 which is in communication between the suction 100 and the conduit 12b at a position upstream of the second gate 118. The butterfly valves 120 and 124 are actuated simultaneously but alternately to withdraw air from the passageways 122 and 124 to the suction 100 from the conduit 12b. As shown, with the valve 120 open and the valve 124 closed, the flap gate 116 will be closed due to suction on its upstream side as well as gravity and flap gate 118 will be closed due to gravity. Thus, air is withdrawn by suction from the return conduit 12b aiding in porpelling vehicles 16 therethrough and the air will pass through the passageway 122 to the suction 100. When a vehicle 16 reaches a photocell sensor 130, suitable controls reverse the butterfly valves 120 and 124 thereby closing passageway 122 and opening passageway 124 to withdraw air from conduit 12b through passageway 126 which opens flap gate 116. When the vehicle 16 passes photocell sensor 132, the butterfly valves 120 and 124 are again reversed to the position shown in FIG. 4 causing the air to be again reversed to the position shown in FIG. 4 causing the air to be again directed through passageway 122 and the flow through passageway 124 is blocked. This causes the vehicle between the gates 116 and 118 to begin to slow down and compress the air in front of the vehicle 16 which will open the second gate 118 allowing the vehicle to pass through gate 118 and into a storage area.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will readily suggest themselves to those skilled in the art and which are encompassed within the spirit of the invention and the scope of the appended claims.

What is claimed is:

1. In an apparatus for controlling a plurality of individual vehicles which are moved through a conduit by air wherein the conduit includes zones one, two and three in sequence from an upstream position towards a downstream portion of the conduit and are inclined downwardly towards downstream, an air blocking vehicle stop is movable into and out of the conduit at the downstream end of zone two for stopping a vehicle in zone two and releasing the vehicle to zone three, a vehicle holding arm is positioned upstream of the vehicle stop and is movable into and out of the conduit in zone two and alternates with the vehicle stop for holding additional vehicles in zones one and two when the stop releases a vehicle to zone three and feeding a vehicle towards the vehicle stop, the improvement comprising, an air pump in parallel with zones one, two and three having a suction connected to zone one and a discharge connected to zone three,
   valve means positioned between the second and third zones for reducing the tendency of vehicles in zones one and two to move upstream including,
   a second air blocking vehicle stop movable into and out of the conduit, and
   a valve connected between the conduit and the atmosphere upstream of the second air blocking vehicle stop, said valve being opened and closed in synchronism with the second air blocking vehicle stop.

2. The apparatus of claim 1 including,
   a second valve connected between the conduit and the pump suction upstream of the second vehicle stop for moving a vehicle downstream.

3. The apparatus of claim 2 wherein the first and second valves are simultaneously but alternately actuated for aiding the admission and exit of a vehicle.

4. In an apparatus for controlling a plurality of individual vehicles which are moved through a conduit by air wherein the conduit includes zones one, two and three in sequence from an upstream position towards a downstream portion of the conduit and are inclined downwardly towards a downstream portion of the conduit and are inclined downwardly towards downstream, an air blocking vehicle stop is movable into and out of the conduit at the downstream end of zone three, a vehicle holding arm is positioned upstream of the vehicle stop and is movable into and out of the conduit in zone two and alternates with the vehicle stop for holding additional vehicles in zones one and two when the stop releases a vehicle to zone three and feeding a vehicle towards the vehicle stop, the improvement comprising, an air pump in parallel with zones one, two and three having a suction connected to zone one and a discharge connected to zone three, a first overhead-suspended swingable valve in said conduit adapted to move between a closed position blocking off said conduit and an open position permitting a vehicle to move therethrough, a second overhead-suspended swingable valve in said conduit downstream of the first valve adapted to move between a closed position blocking off said conduit and an open position permitting a vehicle to move therethrough, and air flow control means connected to the suction of the pump and positioned for alternately withdrawing air from the conduit upstream of each of the first and second valves for allowing vehicles to pass through the first and second valves, but preventing the application of the suction to the conduit downstream of the second valve.

* * * * *